(12) United States Patent
Huet

(10) Patent No.: US 7,828,011 B2
(45) Date of Patent: Nov. 9, 2010

(54) PNEUMATIC SAFETY VALVE

(76) Inventor: Wilfred Huet, 51 Emilie Street, Brantford, Ontario (CA) N3S 1S6

( * ) Notice: Subject to any disclaimer, the term of this patent is extended or adjusted under 35 U.S.C. 154(b) by 76 days.

(21) Appl. No.: 11/699,791

(22) Filed: Jan. 30, 2007

(65) Prior Publication Data
US 2008/0066806 A1 Mar. 20, 2008

(30) Foreign Application Priority Data
Sep. 18, 2006 (CA) .................. 2559878

(51) Int. Cl.
*F16K 17/04* (2006.01)
(52) U.S. Cl. .................. 137/521; 137/551
(58) Field of Classification Search .......... 137/521, 137/460, 551
See application file for complete search history.

(56) References Cited

U.S. PATENT DOCUMENTS

| 572,464 | A | * | 12/1896 | Woods | 137/521 |
| 574,249 | A | * | 12/1896 | Knapp | 285/147.1 |
| 3,293,389 | A | * | 12/1966 | Von Bhicknapahar | 200/81.9 R |
| 3,331,391 | A | * | 7/1967 | McRdinyan | 137/527 |
| 4,295,412 | A | * | 10/1981 | Hachiro | 91/468 |
| 4,319,604 | A | | 3/1982 | Bird | |
| 5,004,010 | A | | 4/1991 | Huet | |
| 5,756,882 | A | * | 5/1998 | Cranfill et al. | 73/46 |

OTHER PUBLICATIONS

Examination Report in corresponding Canadian Patent Application No. 2,559,878. Nov. 19, 2008.

* cited by examiner

*Primary Examiner*—John Rivell
*Assistant Examiner*—Macade Brown
(74) *Attorney, Agent, or Firm*—Wolff & Samson, PC

(57) ABSTRACT

A pneumatic safety valve prevents dangerously rapid outflow of pressurized air in the event that an air hose ruptures or a pneumatic tool is accidentally decoupled from the hose downstream of the valve. The valve has an internal air conduit in fluid communication with the inlet and outlet ports. The air conduit cooperates with a pivotal flap that selectively closes to prevent a sudden discharge of air in the event of a hose rupture or an accidental decoupling of the pneumatic tool from the hose. By containing the highly pressurized air and preventing the air from rapid discharge, the valve prevents the air hose from flailing or whipping violently, thus eliminating the physical dangers to operators and other personnel in the vicinity of the rupture. This simple and inexpensive valve ensures safe containment of hose ruptures or of accidental disconnections of the pneumatic tool from the high-pressure hose.

17 Claims, 2 Drawing Sheets

PNEUMATIC SAFETY VALVE

TECHNICAL FIELD

The present invention relates in general to pneumatic valves and, more particularly, to pneumatic safety valves for preventing a pneumatic hose from flailing dangerously in the event that the hose ruptures or in the event that a pneumatic tool accidentally decouples from the hose.

BACKGROUND OF THE INVENTION

Pneumatic equipment is often used in various fields of industry, particularly in the areas of mining and resource extraction. Typically, pneumatically driven equipment is supplied with compressed air from a pneumatic pump via a long pneumatic hose. Occasionally, a pneumatic tool may accidentally decouple from the pneumatic hose or the hole itself may rupture. Air rushing through the open end of the hose can cause the hose to whip and flail violently, thus posing a serious danger to operators and other personnel working near the rupture point who can be seriously physically injured by the flailing pneumatic hose.

A hose rupture valve located upstream of the rupture point acts to prevent the flailing of the ruptured hose by stopping, or at least greatly slowing, the outflow of air. To date, however, hose rupture valves have been both expensive to purchase and cumbersome to operate. Several prior-art hose rupture valves required the pressure source to be shut down and the pneumatic fluid bled away before the hose could be reconnected or repaired so that normal operations can resume. Other prior-art hose rupture valves, while permitting a limited flow of fluid through the valve after the rupture of the hose, were very complicated to build and thus expensive to purchase.

Applicant's earlier U.S. Pat. No. 5,004,010 entitled HOSE RUPTURE VALVE, which issued to Wilfred Huet on Apr. 2, 1991, disclosed a hose rupture valve for preventing excessive and dangerous flow of fluid through a high pressure hose when the hose is ruptured or the pneumatic tool connected thereto is accidentally decoupled downstream of the valve. The hose rupture valve included a housing containing a cylinder having a pivotally mounted "vane" (i.e. a pivotally mounted flap). During normal operation, the vane would be held open by a spring. If the hose downstream of the valve were ruptured or accidentally decoupled from the pneumatic tool, the pressure within the cylinder would suddenly decrease relative to the pressure within the housing, causing the vane to pivot into a closed position to prevent the excessive flow of fluid through the outlet port of the valve. Although this hose rupture valve functioned very well, further improvements to the design, particularly to simplify manufacturability, would be highly desirable.

SUMMARY OF THE INVENTION

An object of this invention to provide a new and improved pneumatic safety valve which is simple and inexpensive to manufacture. Accordingly, the present invention provides a pneumatic safety valve having inlet and outlet ports for connection to a high-pressure air hose and to pneumatic equipment, respectively, or alternatively to another section of hose. The pneumatic equipment can include any pneumatically driven tool such as, for example, rock drilling tools and chipping hammers used in the mining industry, or, again by way of example only, rivet guns or pneumatic wrenches used in manufacturing industries.

The pneumatic safety valve has an internal air conduit in fluid communication with the inlet and outlet ports. The air conduit cooperates with a pivotal flap that selectively closes to prevent a sudden discharge of air in the event of a hose rupture or an accidental decoupling of the pneumatic tool from the hose. By containing the highly pressurized air and preventing the air from rapid discharge, the valve prevents the air hose from flailing or whipping violently, thus eliminating the physical dangers to operators and other personnel in the vicinity of the rupture.

The flap is biased in an open position, for example using a spring, to allow pressurized airflow through the valve during normal operations. In the event that the hose ruptures or that the tool decouples from the hose, the sudden pressure differential (between the outlet and the air inside the valve) overcomes the resistance of the spring and forces the flap to shut, thus precluding the hose from flailing or whipping violently.

Subsequent to a rupture or a decoupling, the valve automatically equilibrates pressure over a period of time since the flap does not hermetically seal the orifice of the air conduit in the valve, thus permitting pressurized air to bleed out of the valve. Once the pressure equalization has been achieved, (and once the user has shut off pressure source) the hose can be repaired or the tool can be reconnected. Once pressure in the valve has been re-equilibrated, the spring-biased flap will return to its open position to once again permit air to flow through the valve.

Accordingly, one aspect of the present invention provides a pneumatic safety valve for protecting a user of high-pressure pneumatic equipment from a rupture in a high-pressure air hose or from an accidental decoupling of the air hose from the pneumatic equipment. The valve comprises a tubular housing having an inlet port and means for coupling the inlet port to the air hose. The valve also comprises a tubular insert having an outlet port and means for coupling the outlet port to the pneumatic equipment, the tubular insert having threads for engaging complementary threads on the housing for securing the insert to the housing such that a portion of the tubular insert extends into an interior of the housing to define an air conduit between the interior of the housing and the outlet port. The valve further comprises a flap pivotally mounted at an orifice of the conduit, the flap being pivotally movable between an open position for admitting high-pressure air from the housing into the conduit and a closed position for preventing the high-pressure air from flowing into the conduit, the flap moving into the closed position when air pressure downstream of the outlet port suddenly decreases below the pressure inside the housing. The valve further comprises biasing means for biasing the flap into an open position allowing high-pressure air to flow through the outlet port to thus power the pneumatic equipment.

Another aspect of the present invention provides a method of safely operating pneumatic equipment driven by high-pressure air supplied through a high-pressure hose. The method comprises steps of coupling a high-pressure hose to a high-pressure air source and coupling the hose to the safety valve described in the foregoing paragraph for protecting a user of the pneumatic equipment from a rupture in the hose or from an accidental decoupling of the hose from the pneumatic equipment. The method also includes steps of coupling the pneumatic equipment to the outlet port of the safety valve and opening the high-pressure air source to pressurize the hose to power the pneumatic equipment.

Yet another aspect of the present invention provides a pneumatic safety valve comprising a housing having an inlet port and means for coupling the inlet port to the air hose, and an insert having an outlet port and means for coupling the outlet port to the pneumatic equipment, the insert having threads for engaging complementary threads on the housing for securing the insert to the housing such that a portion of the insert extends into an interior of the housing to define an air conduit between the interior of the housing and the outlet port. The valve includes a flap pivotally mounted at an orifice of the conduit and movable between an open position for admitting high-pressure air from the housing into the conduit and a closed position for preventing the high-pressure air from flowing into the conduit when air pressure downstream of the outlet port suddenly decreases below the pressure inside the housing. The valve also includes a spring for urging the flap into an open position to enable high-pressure air to flow through the valve.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DESCRIPTION OF PREFERRED EMBODIMENTS

Figure 1:
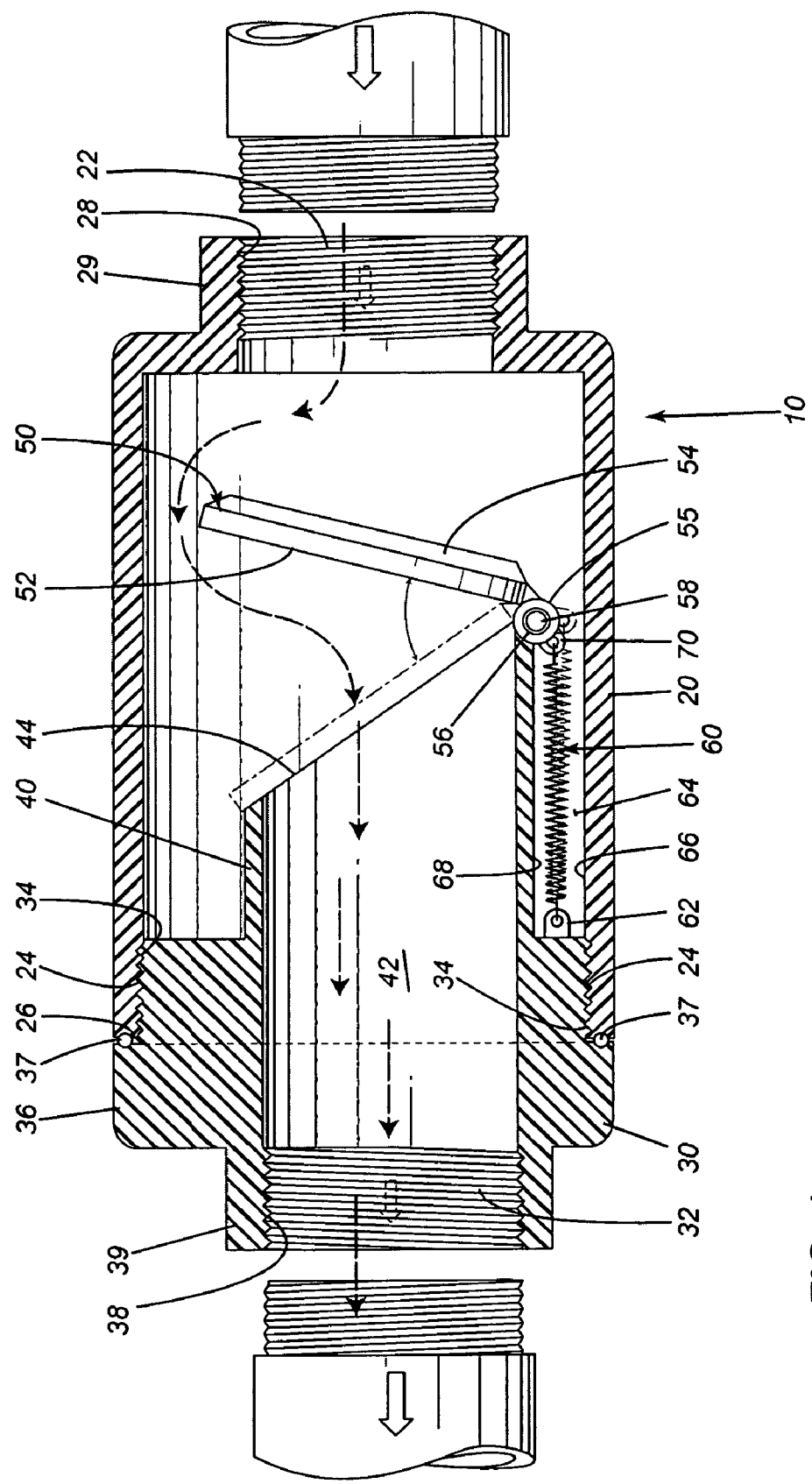
FIG. 1 is a side cross-sectional view of a pneumatic safety valve in accordance with an embodiment of the present invention.

FIG. 1 shows a pneumatic safety valve, generally designated by reference numeral 10, in accordance with a preferred embodiment of the present invention. In the preferred embodiment, as illustrated in FIG. 1, the valve 10 includes a tubular housing 20 and a tubular insert 30. Although the housing 20 and the insert 30 need not be tubular, a tubular housing and a tubular insert are preferred because pressure vessels having circular cross-sections are known to provide optimal pressure containment. The housing and insert can be made of cast steel.

As shown in FIG. 1, the pneumatic safety valve 10 is assembled by securing the tubular insert 30 to the tubular housing 20 to define a passageway for airflow from an inlet port 22 on the tubular housing 20 to an outlet port 32 on the tubular insert 30. In the preferred embodiment shown in FIG. 1, the tubular housing 20 has a set of internal threads 24 which engage (or mesh with) a complementary set of external threads 34 formed on the tubular insert 30. The tubular insert 30 is thus threaded (or screwed) into the tubular housing 20 such that a portion of the tubular insert extends into a cavity (or bore) of the tubular housing. In the preferred embodiment shown in FIG. 1, the tubular insert is partially inserted into the tubular housing until a head or "cap" 36 (i.e. a disc-like flange on the insert) abuts the annular end 26 of the tubular housing. An annular groove in the cap 36 receives an O-ring 37 to ensure an airtight, hermetic seal between the cap and the annular end 26 of the tubular housing.

As shown in FIG. 1, the inlet port 22 of tubular housing 20 includes a means for coupling the housing to a high-pressure hose. Similarly, the outlet port 32 of the tubular insert 30 also includes a means for coupling the insert to pneumatic equipment. Preferably, the means for coupling the housing to the hose includes internal threads and the means for coupling the insert to the pneumatic equipment also includes internal threads. These "pipe threads" can be made in different sizes and with different threads to connect to industry-standard hose connectors or custom made to couple to specific pneumatic fittings. In other words, as shown in FIG. 1, the inlet port and the outlet port each includes an internally threaded annular extension 29, 39 protruding from the housing for receiving respectively externally threaded connectors of the air hose and pneumatic equipment. Thus, in operation, air flows into the housing through the inlet port 22 and exits the valve through the outlet port 32. The direction of predominant air flow is shown by the arrows in FIG. 1.

In the preferred embodiment shown in FIG. 1, a portion 40 of the tubular insert that extends into an interior of the housing 20 define an air conduit 42 between the interior of the housing and the outlet port 32.

As shown in FIG. 1, the valve 10 has a flap 50 pivotally mounted at an orifice 44 of the conduit 42, the flap being pivotally movable between an open position (as shown in FIG. 1) for admitting high-pressure air from the housing into the conduit and a closed position (shown in FIG. 2) for preventing the high-pressure air from flowing into the conduit. The flap 50 moves into the closed position when air pressure downstream of the outlet port suddenly decreases below the pressure inside the housing.

As shown in FIG. 1, the valve 10 has a biasing means for biasing the flap 50 into an open position allowing high-pressure air to flow through the outlet port to thus power the pneumatic equipment. The biasing means preferably includes a spring 60 anchored at one end to a mounting point 62 within the valve (e.g. a hole in the insert or a hook or notch on the outer surface of the insert) and connected at the other end to the flap 50. The conduit of the insert is dimensioned to provide sufficient clearance for the spring 60 when the tubular insert 30 is partially inserted into the tubular housing 20. If the spring 60 were ever to fail, the flap 50 would still close to prevent the dangerous flailing of the air hose. Thus, the spring-loaded flap provides a fail-safe mechanism for ensuring that the air hose does not whip violently in the event of a decoupling or a rupture. After a rupture or decoupling, the pressure will equilibrate and a new spring can be reattached (as part of the refurbishment of the valve).

In a variant, the spring could be a torsional spring mounted perpendicularly to the axis of the conduit. In another variant, instead of a spring, the biasing means may be provided by a combination of rotational friction and gravity which would hold a hanging flap (upside down) in an open position.

The valve preferably further includes a means for stopping the flap 50 at a predetermined angle from a longitudinal axis of the conduit 42. The stopping means can be an integral extension 70 of the flap shaped to bear against an outside side wall of the conduit when the flap swings open to the predetermined angle, such as was disclosed in Applicant's U.S. Pat. No. 5,004,010.

In the preferred embodiment shown in FIG. 1, the flap 50 is a solid member having an elliptical shape. The flap 50 preferably has a flat surface 52 for closing against the orifice to block air from entering the orifice. In another embodiment, the flap can have a small aperture for equilibrating pressure in the event that the flap closes shut, such as was disclosed in Applicant's U.S. Pat. No. 5,004,010 although Applicant has subsequently discovered that this aperture is unnecessary to equilibrate pressure provided that the flap does not hermetically seal against the orifice of the conduit. In the event that the flap closes off the orifice, the valve gradually automatically equilibrates pressure since the surface of the flap does not hermetically seal the orifice of the air conduit, thus permitting pressurized air to bleed out of the valve. Operation of the valve will be discussed in greater detail below.

Figure 2:
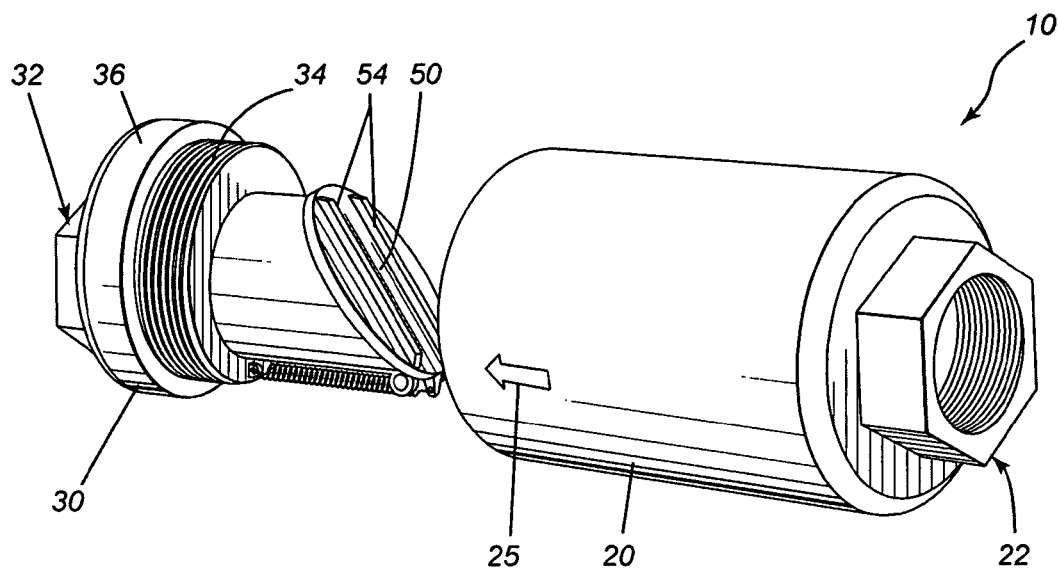
FIG. 2 is an isometric perspective view of the valve of FIG. 1 shown with the tubular insert detached from the tubular housing and with the flap in the closed position.

In the preferred embodiment, as shown in FIG. 1 and FIG. 2, the conduit 42 is truncated at an acute angle (e.g. about 45 degrees relative to a longitudinal axis of the conduit) to form an elliptical orifice. Accordingly, the flap 50 should have a correspondingly elliptical shape to fully cover the elliptical orifice when the flap 50 is in the closed position.

As shown in FIGS. 1 and 2, the flap 50 preferably includes a bracket 54 which supports the flat surface 52 and which is pivotally mounted about a pivot (the construction of which will be elaborated below). The spring 60 is disposed within a gap 64 between an inside wall 66 of the housing and an outside wall 68 of the insert. Preferably, the spring is anchored at one end to the mounting point 62 and connected at the other end to an attachment point on the integral extension 70 the flap 50. In the preferred embodiment, the spring 60 is anchored in tension between the mounting point 62 and the flap 50 so that the spring urges the flap toward the open position until the stopping means (the integral extension 70) bears against an outer surface of the conduit (i.e. the outside wall of the insert 68).

As shown in FIG. 2, on an outer surface of the valve there is preferably a visual marker (such as an arrow 25 or other indicator) enabling the user to properly orient the valve to thereby ensure that the inlet port is coupled to the air hose while the outlet port is coupled to the pneumatic equipment (as the valve must be oriented in the correct direction for it to operate).

Figure 3:
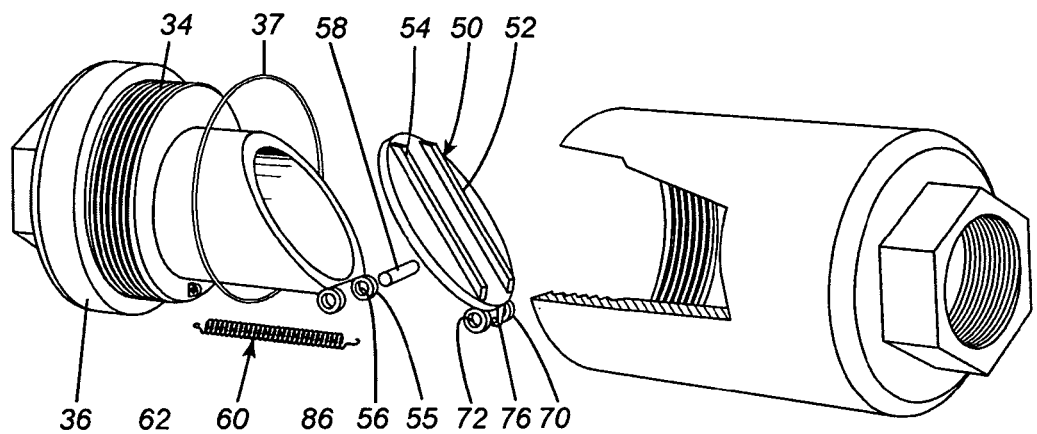
FIG. 3 is an exploded view of the tubular insert and flap assembly.

As shown in FIG. 3, a transverse bore 72 is formed in the integral extension 70 of the flap. This transverse bore 72 is dimensioned to loosely receive a cotter pin 58 so that the flap can rotate freely around the cotter pin when the latter is inserted through the bore. Each end of the cotter pin 58 is constrained within a respective hole 56 formed in each of two parallel extension arms 55 that extend outwardly beyond the orifice of the insert. In other words, as shown in FIG. 3, the arms 55 of the insert hold the cotter pin transversely to the axis of the conduit. In that orientation, the cotter pin 58 serves as a shaft about which the flap 50 can pivot.

Figure 4:
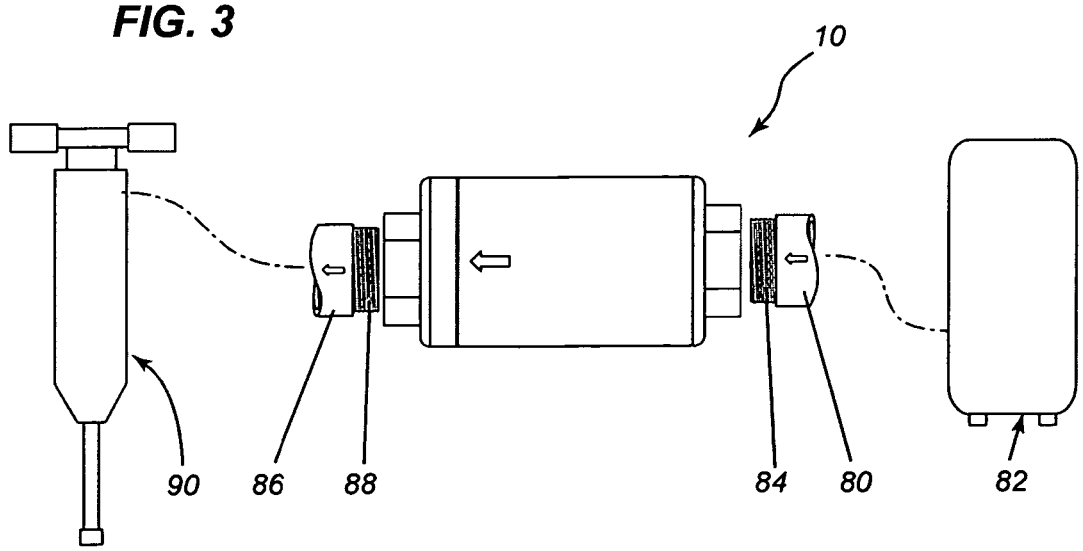
FIG. 4 is a partially schematic side elevation view of the valve of FIG. 1 in use wherein the inlet port is coupled to an air compressor via a high-pressure hose and the outlet port is coupled for another hose to pneumatic equipment.

FIG. 4 shows the pneumatic safety valve 10 in use with a high-pressure air hose 80 and pneumatically-driven equipment 90. The inlet port 22 of the pneumatic safety valve 10 is coupled to the a fitting 84 on the end of the high-pressure hose 80. The air hose 80 is connected, in this example, to an air compressor 82 (although this could be any high-pressure air source). The outlet port 32 of the valve is coupled to the pneumatic equipment 90 or to another section of hose 86 having an end fitting 88, which is typically a threaded connector designed to connect to the pipe threads 38 at the outlet port. Tests performed with this pneumatic safety valve have demonstrated a capacity to withstand at least 2000 psi.

Once the air source 82 and the equipment 90 are turned on, high-pressure air can flow in an unobstructed manner through the open airway of the valve 10 because the flap 50 outside the air conduit is biased into the open position. It is important to note that since pressure builds up relatively slowly inside the valve when the air source is turned on, the flap is not forced shut, i.e. the minor pressure differential between the upstream and downstream sides of the flap is too small to overcome the spring force.

However, in the event of a hose rupture or an accidental decoupling of the pneumatic tool from the hose, the pivotal flap 50 shuts to prevent a sudden discharge of air. By containing the highly pressurized air and preventing the air from rapid discharge, the valve prevents the air hose from flailing or whipping violently, thus eliminating the physical dangers to operators and other personnel in the vicinity of the rupture.

Subsequent to a rupture or a decoupling, the valve automatically equilibrates pressure over a period of time since the flap does not hermetically seal the orifice of the air conduit in the valve, thus permitting pressurized air to bleed out of the valve. Once pressure has equalized, repairs can be made and/or the equipment/hose can be reconnected. Once pressure in the valve has been re-equilibrated, the spring-biased flap will return to its open position to once again permit air to flow through the valve.

Another aspect of this invention provides a method of safely operating pneumatic equipment driven by high-pressure air supplied through a high-pressure hose. The method includes steps of coupling a high-pressure hose to a high-pressure air source (such as air compressor) and coupling the hose to an inlet port 22 of the safety valve 10 in order to protect a user of the pneumatic equipment from a rupture in the hose or from an accidental decoupling of the hose from the pneumatic equipment. The method also includes steps of coupling the pneumatic equipment (such as pneumatic jack hammer and its local hose) to the outlet port 32 of the safety valve 10 and opening the high-pressure air source to pressurize the hose to power the pneumatic equipment. By way of example only, other types of pneumatic equipment include rock drilling tools, chipping hammers, rivet guns or pneumatic wrenches.

It is obvious for those skilled in the art that as the technology develops the basic idea of the invention can be implemented in various ways. The invention and the embodiments thereof are thus not restricted to the examples described above, but they may vary within the scope of the claims.

The invention claimed is:

1. A pneumatic safety valve for protecting a user of high-pressure pneumatic equipment from a rupture in a high-pressure air hose or from an accidental decoupling of the air hose from the pneumatic equipment, the valve comprising:

a tubular housing having an inlet port and means for coupling the inlet port to the air hose;

a tubular insert having an outlet port and means for coupling the outlet port to the pneumatic equipment, the tubular insert having an end cap and threads for engaging complementary threads on the tubular housing for securing the insert to the tubular housing such that the cap abuts an annular end of the tubular housing and an integral portion of the tubular insert extends into an interior of the tubular housing to define an air conduit between the interior of the tubular housing and the outlet port, the insert having a stepped shoulder between the threads and the conduit defining an annular gap between an outside wall of the conduit and an inside wall of the tubular housing;

a flap pivotally mounted at an orifice of the conduit, the flap being pivotally movable between an open position for admitting high-pressure air from the tubular housing into the conduit and a closed position for preventing the high-pressure air from flowing into the conduit, the flap moving into the closed position when air pressure downstream of the outlet port suddenly decreases below the pressure inside the tubular housing; and biasing means for biasing the flap into an open position allowing high-pressure air to flow through the outlet port to thus power the pneumatic equipment, wherein the biasing means comprises a spring anchored at one end to a mounting point affixed to the stepped shoulder and connected at the other end to the flap.

2. The valve as claimed in claim 1 further comprising a means for stopping the flap at a predetermined angle from a longitudinal axis of the conduit.

3. The valve as claimed in claim 2 wherein the stopping means comprises an integral extension of the flap shaped to bear against an outside side wall of the conduit when the flap swings open to the predetermined angle.

4. The valve as claimed in claim 1 wherein the flap is a solid member having an elliptical shape.

5. The valve as claimed in claim 1 wherein the conduit is truncated at an acute angle to form an elliptical orifice and wherein the flap has a correspondingly elliptical shape to fully cover the elliptical orifice when the flap is in the closed position.

6. The valve as claimed in claim 1 wherein the flap in the open position is angled at approximately 45 degrees from a longitudinal axis of the conduit.

7. The valve as defined in claim 1 wherein the tubular housing comprises internal threads for engaging a set of complementary external threads on the tubular insert.

8. The valve as claimed in claim 1 wherein the means for coupling the tubular housing to the hose comprise internal threads and the means for coupling the insert to the pneumatic equipment also comprise internal threads.

9. The valve as claimed in claim 1 wherein the inlet port and the outlet port each comprises an internally threaded annular extension protruding from the tubular housing for receiving respectively externally threaded connectors of the air hose and pneumatic equipment.

10. The valve as claimed in claim 1 further comprising a bracket for pivotally supporting the flap.

11. The valve as claimed in claim 1 wherein the housing comprises a visual marker enabling the user to properly orient the valve to thereby ensure that the inlet port is coupled to the air hose while the outlet port is coupled to the pneumatic equipment.

12. A method of safely operating pneumatic equipment driven by high-pressure air supplied through a high-pressure hose, the method comprising steps of:
    coupling a high-pressure hose to a high-pressure air source;
    coupling the hose to a safety valve for protecting a user of the pneumatic equipment from a rupture in the hose or from an accidental decoupling of the hose from the pneumatic equipment, the valve comprising:
        a tubular housing having an inlet port and means for coupling the inlet port to the air hose;
        a tubular insert having an outlet port and means for coupling the outlet port to the pneumatic equipment, the tubular insert having an end cap and threads for engaging complementary threads on the tubular housing for securing the insert to the tubular housing such that the cap abuts an annular end of the tubular housing and an integral portion of the tubular insert extends into an interior of the tubular housing to define an air conduit between the interior of the tubular housing and the outlet port, the insert having a stepped shoulder between the threads and the conduit defining an annular gap between an outside wall of the conduit and an inside wall of the tubular housing;
        a flap pivotally mounted at an orifice of the conduit, the flap being pivotally movable between an open position for admitting high-pressure air from the tubular housing into the conduit and a closed position for preventing the high-pressure air from flowing into the conduit, the flap moving into the closed position when air pressure downstream of the outlet port suddenly decreases below the pressure inside the tubular housing; and
        biasing means for biasing the flap into an open position allowing high-pressure air to flow through the outlet port to thus power the pneumatic equipment, wherein the biasing means comprises a spring anchored at one end to a mounting point affixed to the stepped shoulder and connected at the other end to the flap;
    coupling the pneumatic equipment to the outlet port of the safety valve; and
    opening the high-pressure air source to pressurize the hose to power the pneumatic equipment.

13. The method as defined in claim 12 further comprising a prior step of assembling the safety valve by securing external threads on the tubular insert to complementary internal threads on the tubular housing.

14. The method as defined in claim 12 further comprising orienting the valve by referring to a visual marker on the tubular housing to ensure that the outlet port is coupled to the pneumatic equipment and the inlet port to the air hose.

15. The method as claimed in claim 12 wherein the step of coupling the hose to the safety valve comprises threading the hose to internal threads at the inlet port and wherein the step of coupling the valve to the pneumatic equipment comprises threading the pneumatic equipment to internal threads at the outlet port.

16. A pneumatic safety valve comprising:
    a housing having an inlet port and means for coupling the inlet port to the air hose;
    an insert having an outlet port and means for coupling the outlet port to the pneumatic equipment, the insert having an end cap and threads for engaging complementary threads on the tubular housing for securing the insert to the tubular housing such that the cap abuts an annular end of the tubular housing and an integral portion of the insert extends into an interior of the tubular housing to define an air conduit between the interior of the tubular housing and the outlet port, the insert having a stepped shoulder between the threads and the conduit defining an annular gap between an outside wall of the conduit and an inside wall of the tubular housing;
    a flap pivotally mounted at an orifice of the conduit and movable between an open position for admitting high-pressure air from the tubular housing into the conduit and a closed position for preventing the high-pressure air from flowing into the conduit when air pressure downstream of the outlet port suddenly decreases below the pressure inside the housing; and
    a spring for urging the flap into an open position to enable high-pressure air to flow through the valve, wherein the spring is anchored at one end to a mounting point affixed to the stepped shoulder and connected at the other end to the flap, and wherein the spring is disposed within a gap between an inside wall of the housing and an outside wall of the insert.

17. The valve as claimed in claim 16 wherein the spring is anchored in tension between the mounting point and an attachment point on the flap that is adjacent a pivot point of the flap to thereby urge the flap toward the open position until a stopping means bears against an outer surface of the conduit.

* * * * *